(12) United States Patent
Choate et al.

(10) Patent No.: US 11,585,462 B2
(45) Date of Patent: Feb. 21, 2023

(54) DUAL PURPOSE POSITION INDICATOR

(71) Applicant: Baker Hughes Oilfield Operations LLC, Houston, TX (US)

(72) Inventors: Jeremy Ryan Choate, Houston, TX (US); Travis Kyle McEvoy, Houston, TX (US); Lloyd R. Cheatham, Lake Jackson, TX (US); Keith M. Adams, Katy, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 684 days.

(21) Appl. No.: 16/514,916

(22) Filed: Jul. 17, 2019

(65) Prior Publication Data

US 2021/0018115 A1 Jan. 21, 2021

(51) Int. Cl.
*F16K 37/00* (2006.01)
*F16K 31/126* (2006.01)
*G01M 3/28* (2006.01)

(52) U.S. Cl.
CPC ........ *F16K 37/0008* (2013.01); *F16K 31/126* (2013.01); *F16K 31/1262* (2013.01); *G01M 3/2876* (2013.01)

(58) Field of Classification Search
CPC .... F16K 31/1221; F15B 15/10; F15B 19/005; F15B 2211/864; G01M 3/2876
See application file for complete search history.

(56) References Cited

U.S. PATENT DOCUMENTS

| | | | | |
|---|---|---|---|---|
| 6,015,134 A | * | 1/2000 | Johnson | F16K 31/1262 251/63.4 |
| 8,910,658 B2 | | 12/2014 | Adams | |
| 2005/0092079 A1 | * | 5/2005 | Ales | F16K 31/1221 73/270 |
| 2015/0204456 A1 | * | 7/2015 | Adams | F16K 31/1221 251/63.6 |
| 2018/0023725 A1 | * | 1/2018 | McEvoy | F15B 15/1447 251/63.6 |

* cited by examiner

*Primary Examiner* — Atif H Chaudry
(74) *Attorney, Agent, or Firm* — Hogan Lovells US LLP

(57) ABSTRACT

An actuator assembly for moving a valve between an open position and a closed position includes an actuator housing forming at least a portion of a chamber. The actuator assembly also includes a support plate arranged within the actuator housing. The actuator assembly further includes a diaphragm coupled to the actuator housing and the support plate, the diaphragm expanding and contracting in response to a working fluid within the chamber. The actuator assembly also includes an indicator rod extending through the chamber and out of the actuator housing, the indicator rod being removably coupled to the support plate, wherein the indicator rod is arranged within an opening formed in the support plate, the indicator rod secured to the support plate via a coupling mechanism that releases the indicator rod in response to a pressure from the working fluid between the diaphragm and the support plate.

16 Claims, 10 Drawing Sheets

DUAL PURPOSE POSITION INDICATOR

BACKGROUND OF THE DISCLOSURE

1. Field of the Disclosure

The present disclosure relates in general to valves for mineral recovery wells, and in particular to indicators regarding an operating condition of the valves.

2. Brief Description of Related Art

Valves used in hydrocarbon drilling and production operations can be operated by a variety of different actuators, such as pneumatic, piston, hydraulic, and the like. In operation, the actuator moves a stem linearly or rotationally, or both linearly and rotationally, to open or close the valve. The actuator may include a rod that extends to a cap, which further couples to a stem of the valve to translate motion from the actuator to the stem. Certain types of actuators may include bladders or diaphragms that move in response to pressure media, such as gas or other fluids, urging the diaphragm toward the valve body. The diaphragm is supported by a support plate. When the diaphragm is urged downward with the pressure media, it urges the support plate downward, which then transfers the downward force via a stem to the valve to open or close the valve, as applicable. However, it may be difficult to inspect and detect leaks or tears in the diaphragm, and as a result, operation of the valve may be negatively impacted without an operator knowing until attempting to stroke the valve.

SUMMARY OF THE DISCLOSURE

Applicants recognized the problems noted above herein and conceived and developed embodiments of systems and methods, according to the present disclosure, for providing an indication.

In an embodiment an actuator assembly for moving a valve between an open position and a closed position includes an actuator housing forming at least a portion of a chamber for receiving a working fluid to drive movement of valve stem of the valve. The actuator assembly also includes a support plate arranged within the actuator housing, the support plate forming at least a portion of the chamber. The actuator assembly further includes a diaphragm coupled to the actuator housing and the support plate, the diaphragm expanding and contracting in response to the working fluid within the chamber. The actuator assembly also includes an indicator rod extending through the chamber and out of the actuator housing, the indicator rod being removably coupled to the support plate, wherein the indicator rod is arranged within an opening formed in the support plate extending axially lower than the diaphragm, the indicator rod secured to the support plate via a coupling mechanism that releases the indicator rod in response to a pressure from the working fluid between the diaphragm and the support plate.

In another embodiment a visual position indicator for a diaphragm actuator includes an indicator rod having a first end coupled to a support plate of the diaphragm actuator and a second end extending through an opening of a lid of the diaphragm actuator such that at least a portion of the indicator rod is arranged external to a chamber of the diaphragm actuator. The visual position indicator also includes a coupling mechanism that releasably secures the indicator rod to the support plate, the coupling mechanism positioning the indicator rod to translate within the cavity in response to movement of the support plate, wherein the coupling mechanism releases the indicator rod in response to a pressure from a working fluid acting at a bottom of the indicator rod, the pressure traveling along a flow path in response to at least one leak point within the chamber.

In an embodiment an actuator assembly for moving a valve between an open position and a closed position includes an actuator housing forming at least a portion of a chamber for receiving a working fluid to drive movement of valve stem of the valve. The actuator assembly also includes a support plate arranged within the actuator housing, the support plate forming at least a portion of the chamber. The actuator assembly further includes a diaphragm coupled to the actuator housing and the support plate, the diaphragm expanding and contracting in response to the working fluid within the chamber. The actuator assembly also includes a visual position indicator. The visual position indicator includes an indicator rod having a first end coupled to the support plate and a second end extending through an opening of a lid of the actuator housing to position at least a portion of the indicator rod external to the chamber. The visual position indicator also includes a coupling mechanism that releasably secures the indicator rod to the support plate, wherein the coupling mechanism releases the indicator rod in response to a pressure from the working fluid acting at a bottom of the indicator rod, the pressure traveling along a flow path in response to at least one leak point through the diaphragm.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE PREFERRED EMBODIMENT

Figure 1:
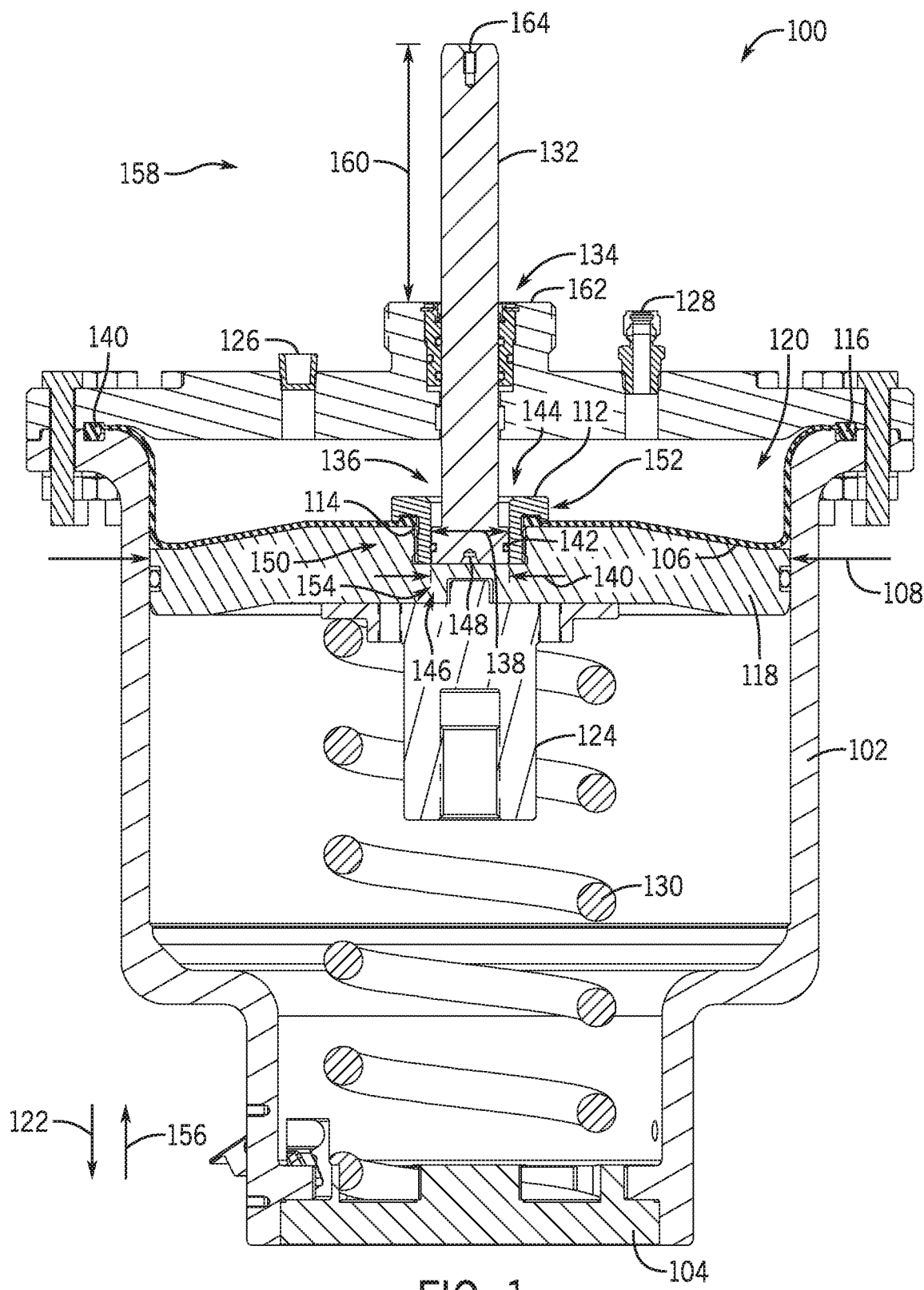
FIG. 1 is a cross-sectional side view of an embodiment of an actuator assembly including a position indicator, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include an indicator rod that may be utilized with diaphragm actuators to provide a visual indication regarding damage to the diaphragm. In various embodiments, the indicator rod is coupled to a support plate that translates within an actuator housing in response to a working fluid in the actuator housing. During normal operation, the diaphragm may block fluid from entering a cavity that couples the indicator rod to the support plate. However, if the diaphragm is damaged, the fluid may enter the cavity and apply a pressure to the indicator rod. The indicator rod may be coupled to the support plate via a coupling mechanism that is particularly selected to disengage the indicator rod at a certain pressure. Once disengaged, the indicator rod may translate within the housing to a position indicative of the damaged diaphragm. An operator may see the position or receive an alert.

In embodiments, a dual purpose position indicator may be utilized with an actuator. An indicator rod serves as a position indicator while the bladder sealing is intact. When the bladder seal gets damage, pressure will leak below the position indicator causing the position indicator to rise to the top of the actuator housing, thereby providing an indication of bladder damage. The indicator rod, once moved to the position indicating damage, is fixed, in various embodiments, such that additional pressure application to the bladder will not change the position of the indicator rod.

In various embodiments, the indicator rod will serve as a position indicator while dual seals are intact. For example, the indicator rod has a lower seal where it is attached to an actuator sealing arm. This lower seal is larger than a diameter of the upper rod. The upper rod seals on the top cap seals. When pressure is applied to the bladder seal, the pressure will force the indicator rod to follow the movement of the sealing arm due to the pressure differential of the rod diameter and the indicator lower seal. When the bladder has a leak, the pressure is transferred below the indicator lower seal. This causes pressure to act over the bottom of the entire indicator rod, which causes the rod to move to the top cap.

FIG. 1 is a cross-sectional view of an embodiment of a valve actuator assembly 100 (e.g., actuator assembly) that is used to open or close a valve, to which the actuator assembly 100 is connected. As one skilled in the art will appreciate, the valve can be a gate valve or any other type of valve that is actuated by the extension of a linear member. The actuator assembly 100 includes a housing 102 that couples the actuator assembly 100 to a bonnet 104, which is coupled to the valve (not pictured). The illustrated actuator assembly 100 may be referred to as a diaphragm actuator that includes a flexible diaphragm 106 (e.g., bladder) extending across at least a portion of a diameter 108 of the housing 102. In the illustrated embodiment, the diaphragm 106 is fixed to the housing 102 at a first location 110, to a cap 112 at a second location 114, and to the housing 102 at a third location 116.

The illustrated cap 112 is coupled to a support plate 118, which may also be coupled to at least a portion of the diaphragm 106. In response to a pressure in a chamber 120 of the housing 102, the support plate 118 may move in a linearly downward direction 122, thereby driving a stem connector 124 coupled to an opposite side of the support plate 118 in the downward direction 122. Accordingly, a valve stem (not pictured) coupled to the stem connector 124 will be driven in the downward direction 122.

The housing 102 includes an inlet orifice 126 and an outlet orifice 128, which may be utilized to introduce working fluid (e.g., pneumatics, liquids, etc.) into the housing 102. For example, in some embodiments, working fluid may be directed into the housing 102 through the inlet 126, which provides a force on the diaphragm 106, and as a result the support plate 118, to drive the support plate 118 in the downward direction 122. Release of the working fluid through the outlet orifice 128 may facilitate returning the support plate 118 to the previous position, for example, via a counter force provided by a resilient member 130, such as a spring.

In various embodiments, it may be difficult to ascertain whether or not there is damage to the diaphragm 106, which may decrease the effectiveness of the actuator assembly 100. Embodiments of the present disclosure include an indicator rod 132 mounted to the cap 112 and extending through an opening 134 in the housing 102. As will be described below, the indicator rod 132 may be removably coupled to the cap 112 and/or the support plate 118 and translate along with the support plate 118 when the diaphragm 106 is not damaged or punctured. However, damage to the diaphragm 106 may provide a flow path into a cavity 136 of the cap 112 to drive the indicator rod 132 out of contact with the cap 112 and/or the support plate 118, thereby providing an indication of damage to the diaphragm 106.

In the illustrated embodiment, the indicator rod 132 is installed within the cavity 136. A lower diameter 138 of the indicator rod 132 may be substantially similar to a cavity diameter 140. The indicator rod 132 may further include seals 142 arranged at the lower diameter 138 to block working fluid ingress into the cavity 136 via a first flow direction 144. In certain embodiments, the indicator rod 132 is removably coupled to at least one of the cap 112 and/or the support plate 118. For example, a coupling mechanism 146 may be utilized to secure the indicator rod 132 to the cap 112 and/or the support plate 118. In certain embodiments, the coupling mechanism 146 includes a magnetic connection between the indicator rod 132 and the cap 112 and/or the support plate 118. However, in other embodiments, the coupling mechanism 146 may be shear pins or the like that couple the indicator rod 132 to the cap 112. The indicator rod 132 illustrated in FIG. 1 further includes a recess 148, which may direct or otherwise concentrate working fluid forces acting on the indicator rod 132 if the diaphragm 106 is damaged.

As will be described below, in various embodiments a coupling device 150 may secure the diaphragm 106 to at least one of the cap 112, the support plate 118, and/or the indicator rod 132. For example, the coupling device 150 may include a seal ring, an adhesive, a fastener, or the like. If the diaphragm 106 is damaged, for example is torn, pressure from the working fluid may migrate toward the cap 112, for example via a flow path 152, directing the pressure toward a bottom 154 of the indicator rod 132. The pressure may be contracted at the recess 148, as described above, or act along the indicator rod 132. In various embodiments, the coupling mechanism 146 is particularly selected to release the indicator rod 132 when exposed to a threshold amount of pressure, for example, a certain amount of pressure from the working fluid. The seals 142 along the indicator rod 132 may block the pressure from escaping the cavity 136, thereby driving the indicator rod 132 in an upward direction 156 to separate the indicator rod 132 from the cap 112 and/or support plate 118.

It should be appreciated that a relative positon of the indicator rod 132, relative to the housing 102, may be indicative of a valve position and/or whether the diaphragm 106 is damaged. For example, an exposed portion 158 of the indicator rod 132 extends a distance 160 from a top 162 of the housing 102 to a top 164 of the indicator rod 132. It should be appreciated that the distance 160 may be variable and may be indicative of one or more features, such as valve position or diaphragm condition, as will be described in detail below. In the embodiment illustrated in FIG. 1, the distance 160 may be illustrative of the valve being in a closed position.

Figure 2:
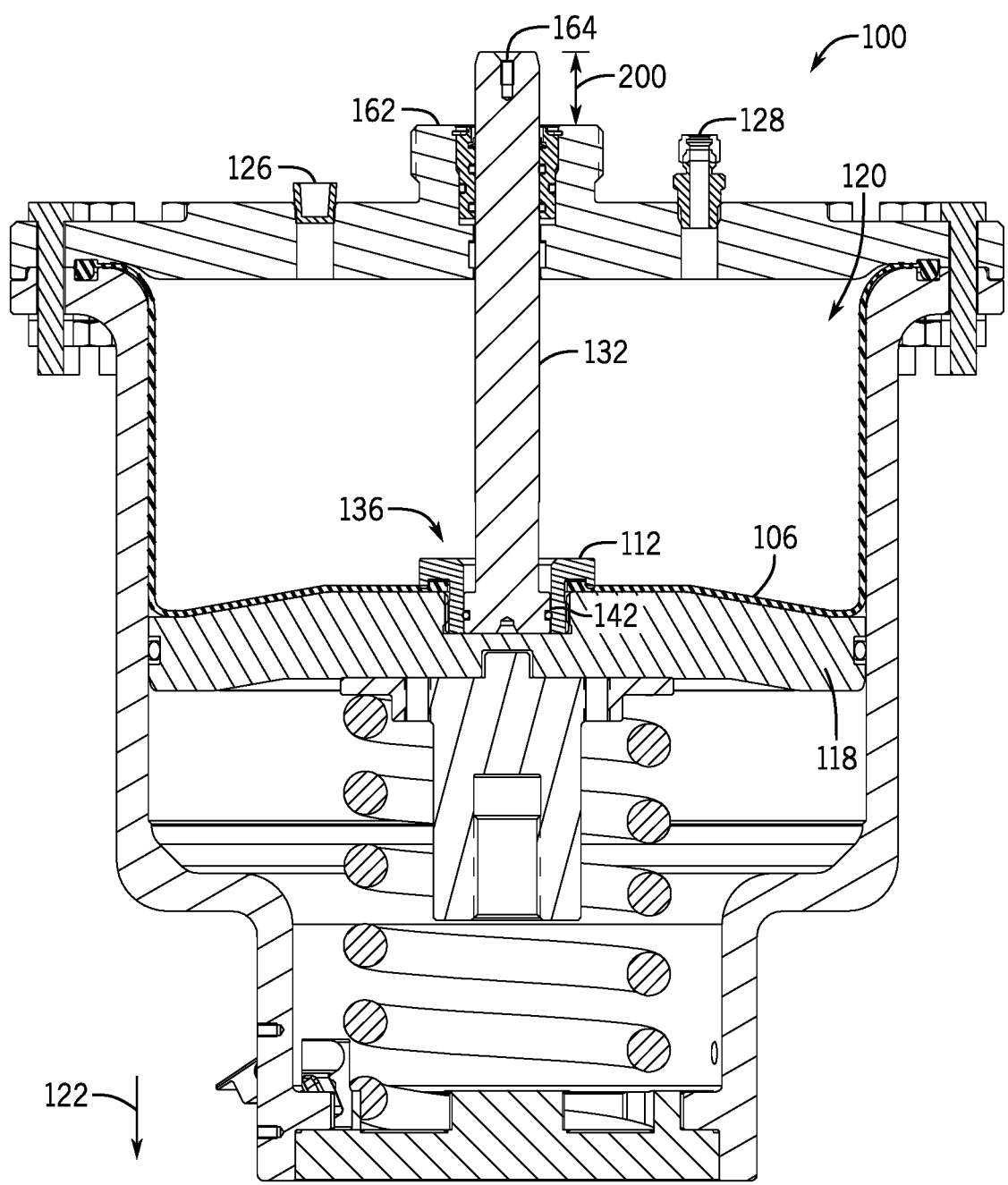
FIG. 2 is a cross-sectional side view of an embodiment of an actuator assembly including a position indicator, in accordance with embodiments of the present disclosure.

FIG. 2 is a cross-sectional view of an embodiment of the actuator assembly 100 illustrating the indicator rod 132 in an open position. When compared to the distance 160 illustrated in FIG. 1, the distance 200 is shorter. Accordingly, a visual indication regarding the operational position may be provided from a distance. As will be described below, in various embodiments different portions of the indicator rod 132 may be painted or otherwise marked to indicate position from a distance.

In the illustrated embodiment, working fluid is introduced through the inlet 126 to drive the support plate 118 in the downward direction 122. Due to the coupling between the indicator rod 132 and the cap 112 and/or support plate 118, the indicator rod 132 also moves in the downward direction 122, thereby decreasing the distance 200, when compared to the distance 160 in FIG. 1.

Figure 3:
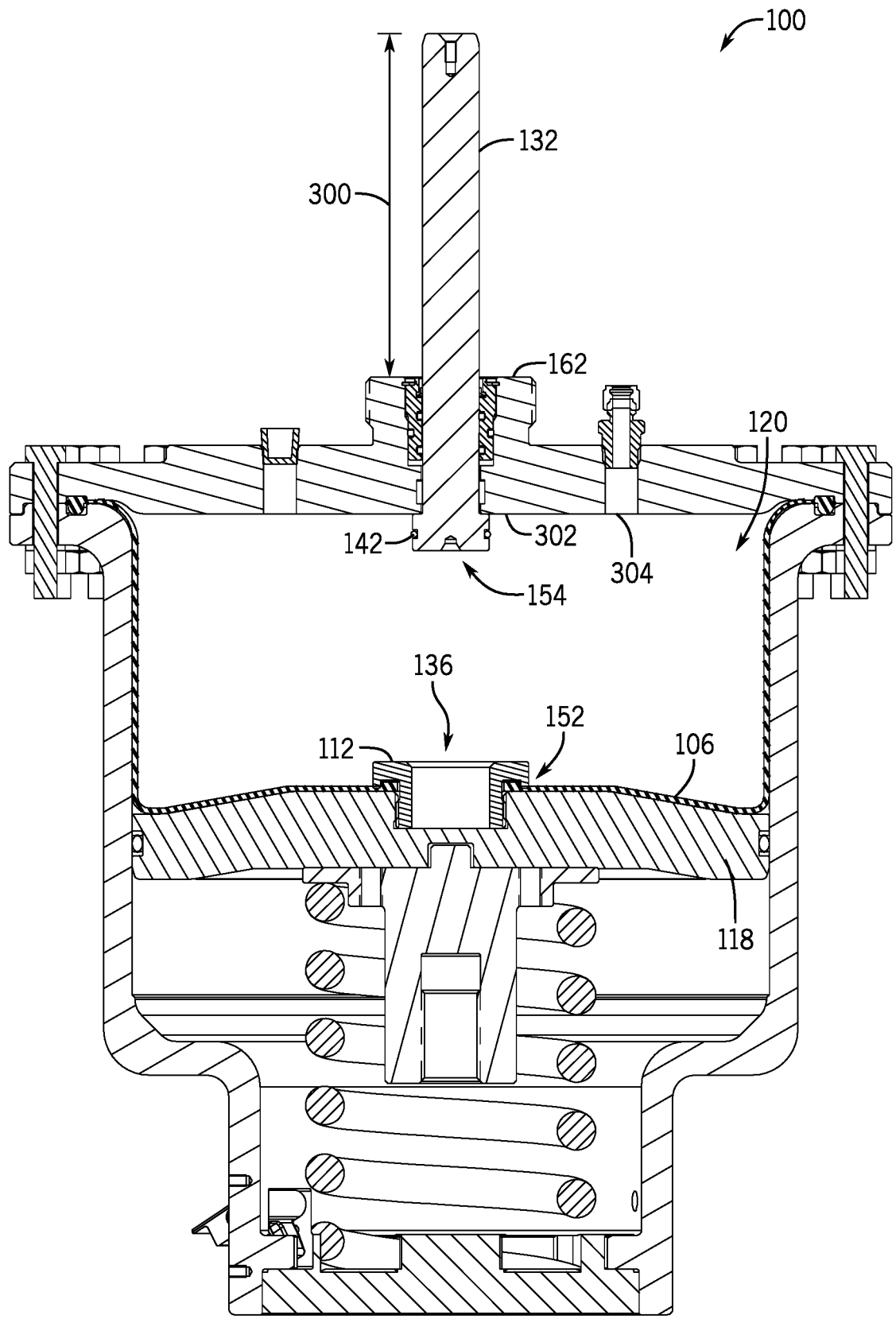
FIG. 3 is a cross-sectional side view of an embodiment of an actuator assembly including a position indicator, in accordance with embodiments of the present disclosure.

FIG. 3 is a cross-sectional side view of an embodiment of the actuator assembly 100 illustrating a damaged diaphragm 106 while in an open position. In the illustrated embodiment, the indicator rod 132 extends a distance 300 from the top 162, which is greater than the distance 200 and the distance 160. As described above, in various embodiments, the diaphragm 106 may be ripped or otherwise damaged, thereby providing the flow path 152 for pressure to migrate toward the bottom 154 of the indicator rod 132. In various embodiments, the coupling mechanism 146 is particularly selected to release the indicator rod 132 when exposed to a threshold pressure. As a result, the indicator rod 132 is driven upward in the chamber 120, until a shoulder 302 of the indicator rod 132 abuts a lid 304 of the actuator assembly 100. It should be appreciated that the shoulder 302 is for illustrative purposes only and that other mechanisms may be utilized to limit movement of the indicator rod 132 with respect to the lid 304. It should be appreciated that, in various embodiments, damage to the diaphragm 106 may cause the diaphragm 106 to rise toward the lid 304, decoupled from the cap 112 and/or the support plate 118, and that the position shown in FIG. 3 is for illustrative purposes only.

Figure 4:
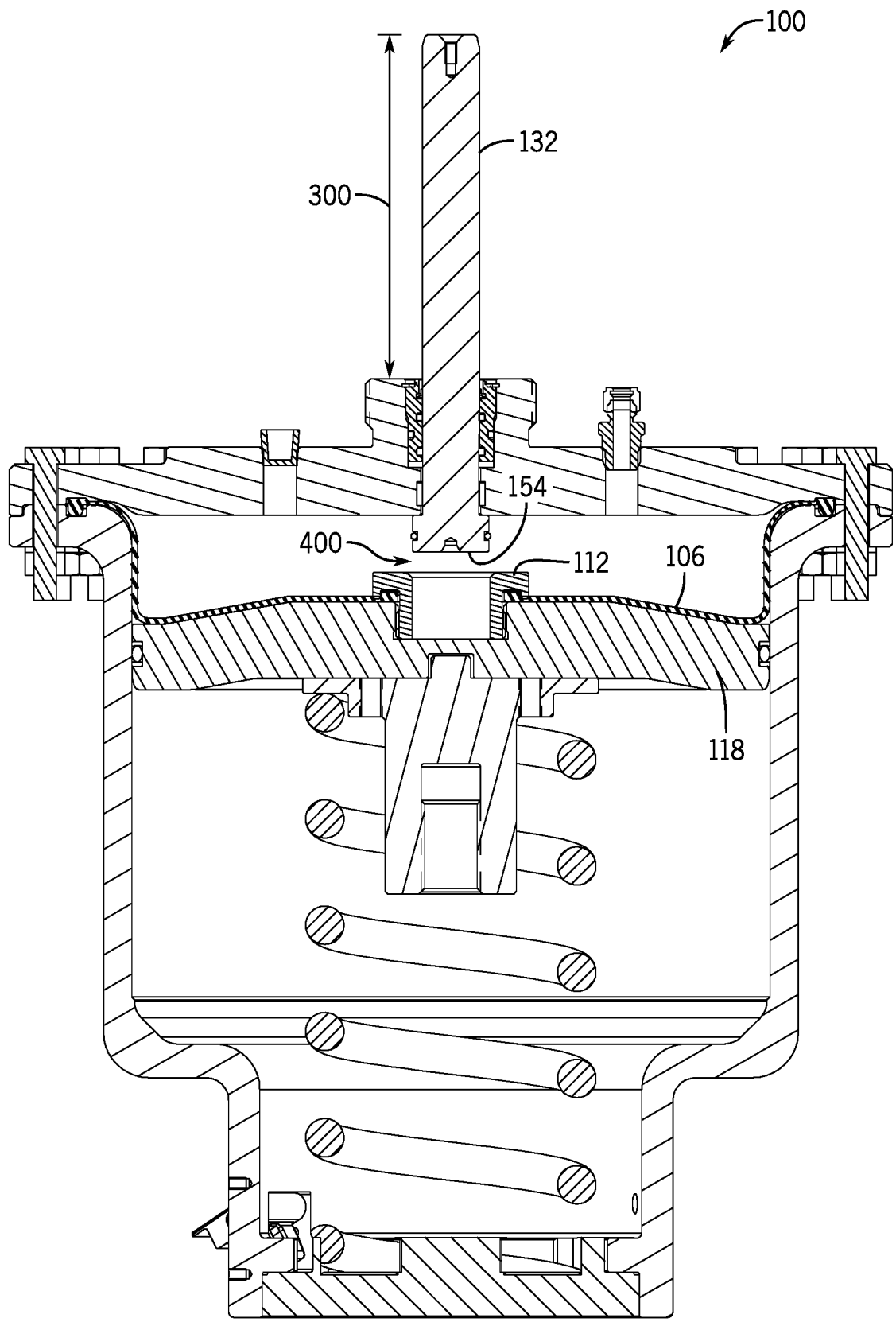
FIG. 4 is a cross-sectional side view of an embodiment of an actuator assembly including a position indicator, in accordance with embodiments of the present disclosure.

FIG. 4 is a cross-sectional side view of an embodiment of the actuator assembly 100 that includes the damaged diaphragm 106 while in a closed position. In the illustrated embodiment, although the operating position of the valve has changed (from open in FIG. 3 to closed in FIG. 4), the distance 300 has not changed. Accordingly, an operator will receive an indication that the diaphragm 106 has been damaged, regardless of the operational position of the valve. As illustrated, a gap 400 is positioned between the bottom 154 of the indicator rod 132 and the cap 112, and as a result, movement of the support plate 118 after the indicator rod 132 separates does not impact the location of the indicator rod 132.

Figure 5:
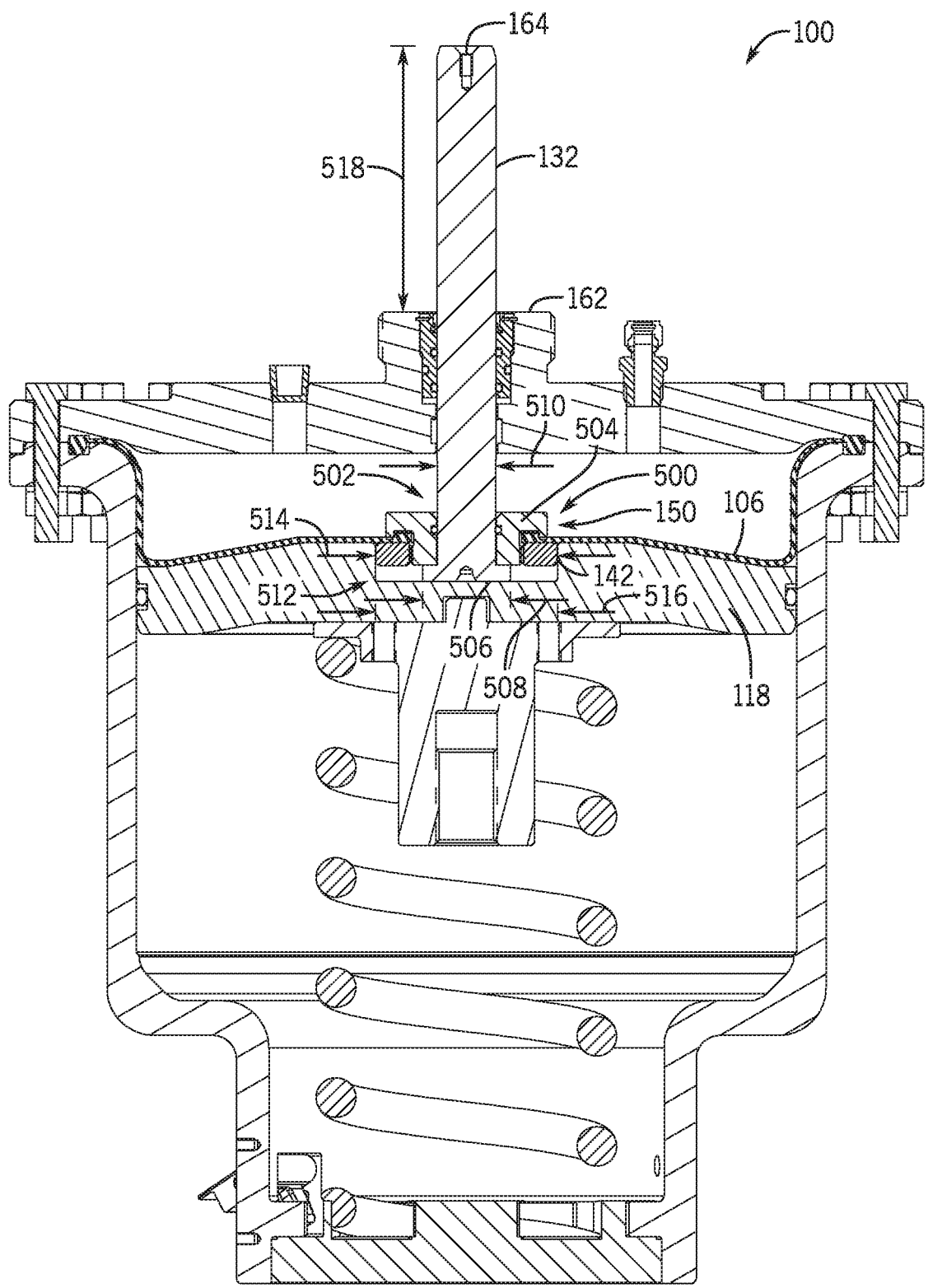
FIG. 5 is a cross-sectional side view of an embodiment of an actuator assembly including a position indicator, in accordance with embodiments of the present disclosure.

FIG. 5 is a cross-sectional side view of an embodiment of the actuator assembly 100 replacing the cap 112 (FIGS. 1-4) with a rod retainer 500. In the illustrated embodiment, the rod retainer 500 is removably coupled to the support plate 118 and is installed within an opening 502 formed in the support plate. The rod retainer 500 includes a fitting 504 arranged circumferentially about the indicator rod 132. In the illustrated embodiment, at least a portion of the indicator rod 132, corresponding to a shoulder 506 having a larger diameter 508 than a rod diameter 510, is arranged axially lower than the fitting 504. As a result, the fitting 504 may be seated on the shoulder 506, forming a space 512 between the opening 502 and the fitting 504.

FIG. 5 further illustrates the diaphragm 106 coupled to the rod retainer 500 via the coupling device 150, which is a seal ring in the illustrated embodiment. In the illustrated embodiment, the seals 142 have a diameter 514 that is substantially equal to an opening diameter 516, thereby at least partially securing the rod retainer 500 within the opening 502. As described above, in various embodiments the coupling mechanism 146, such as a magnetic connector, shear pins, and the like, may be utilized to secure the rod retainer 500 to the support plate 118. The coupling mechanism 146 may be particularly selected to release at a certain pressure within the opening 502, for example, within the space 512, to enable the indicator rod 132 to decouple from the support plate 118.

In the illustrated embodiment, the operational position of the actuator is closed and the indicator rod 132 includes the exposed portion 158 extending a distance 518. The distance 518 may be marked or otherwise indicated on the indicator rod 132, as a position indicative of a closed value and a functional or non-damaged diaphragm 106. As described above, in operation, damage to the diaphragm may change the position of the indicator rod 132.

Figure 6:
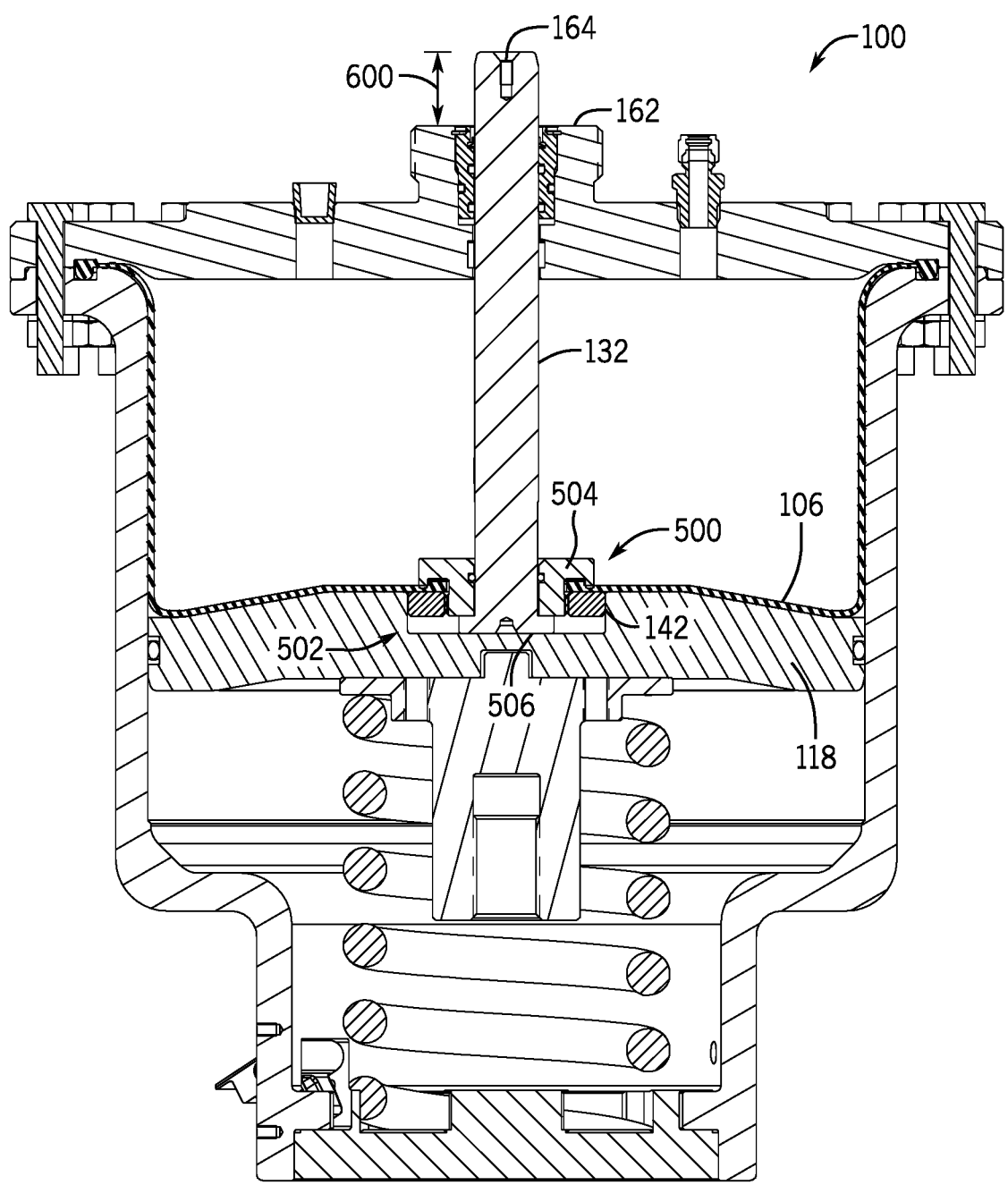
FIG. 6 is a cross-sectional side view of an embodiment of an actuator assembly including a position indicator, in accordance with embodiments of the present disclosure.

FIG. 6 is a cross-sectional side view of an embodiment of the actuator assembly 100 where the support plate 118 is transitioned to the open position. As a result, a distance 600 from the top 162 of the housing 162 to the top 164 of the indicator rod 132 is less than the distance 518 illustrated in FIG. 5. In the illustrated embodiment, the diaphragm 106 is not damaged, and as a result, the rod retainer 500 remains coupled to the support plate 118.

Figure 7:
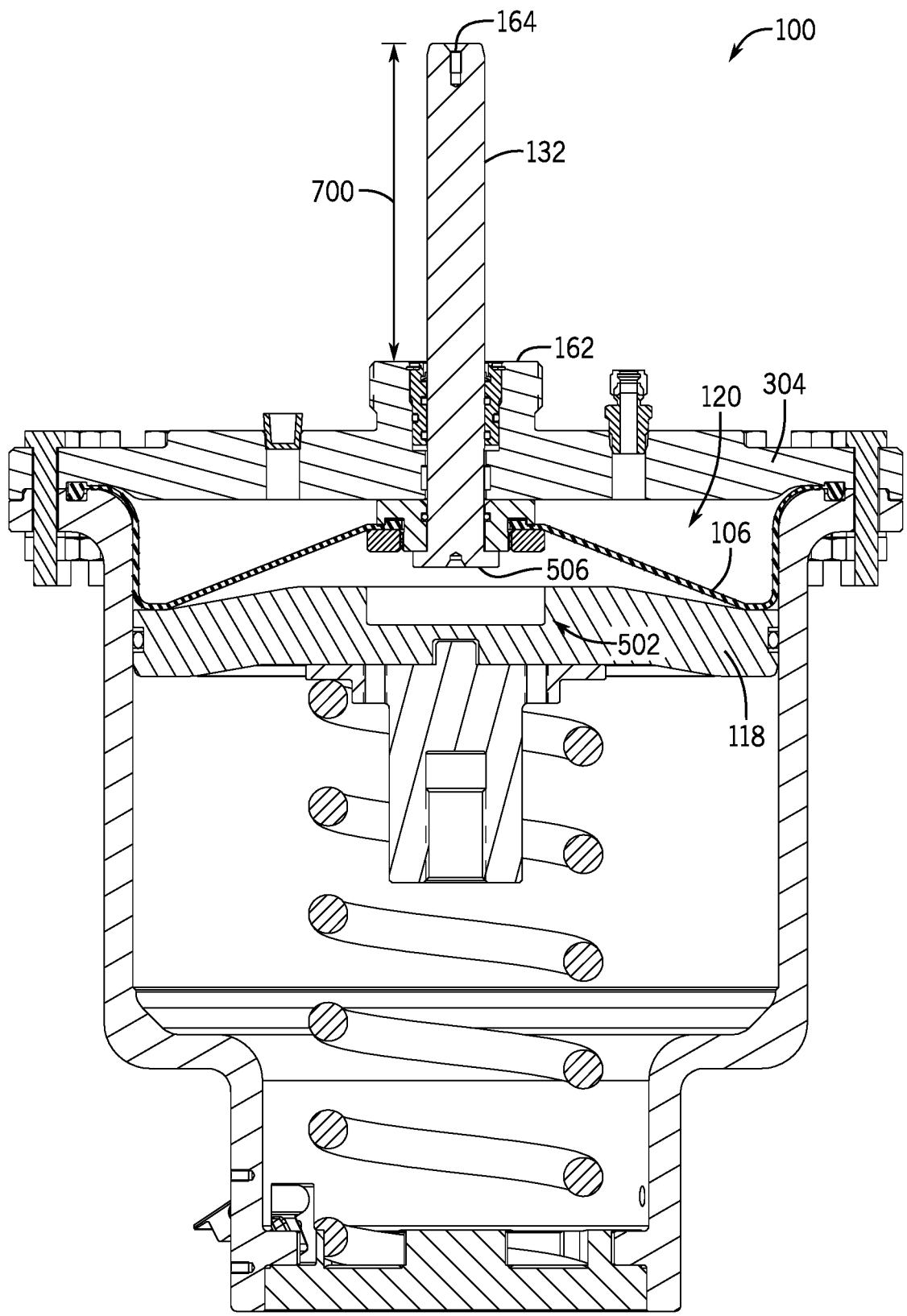
FIG. 7 is a cross-sectional side view of an embodiment of an actuator assembly including a position indicator, in accordance with embodiments of the present disclosure.

FIG. 7 is a cross-sectional side view of an embodiment of the actuator assembly 100 illustrating a decoupling between the rod retainer 500 and the support plate 118. In the illustrated embodiment, pressure media injected into the chamber 120 may move past the damaged diaphragm 106 and into the opening 502, applying a pressure to the seals 514 and/or the shoulder 506. Because the coupling mechanism 146 is particularly selected to release at a threshold pressure, which may be equal to a pressure to operate the actuator assembly 100, the rod retainer 500 is decoupled from the support plate 118 and driven toward the lid 304. In the illustrated embodiment, the rod retainer 500 is arranged in contact with the lid 304, however, it should be appreciated that other mechanisms may restrict movement of the indicator rod 132.

A distance 700 is greater than the distance 518 and greater than the distance 600, thereby providing a visual indication of damage to the diaphragm 106. As noted above, the indicator rod 132 may include various markings or the like to provide a visual indication.

Figure 8:
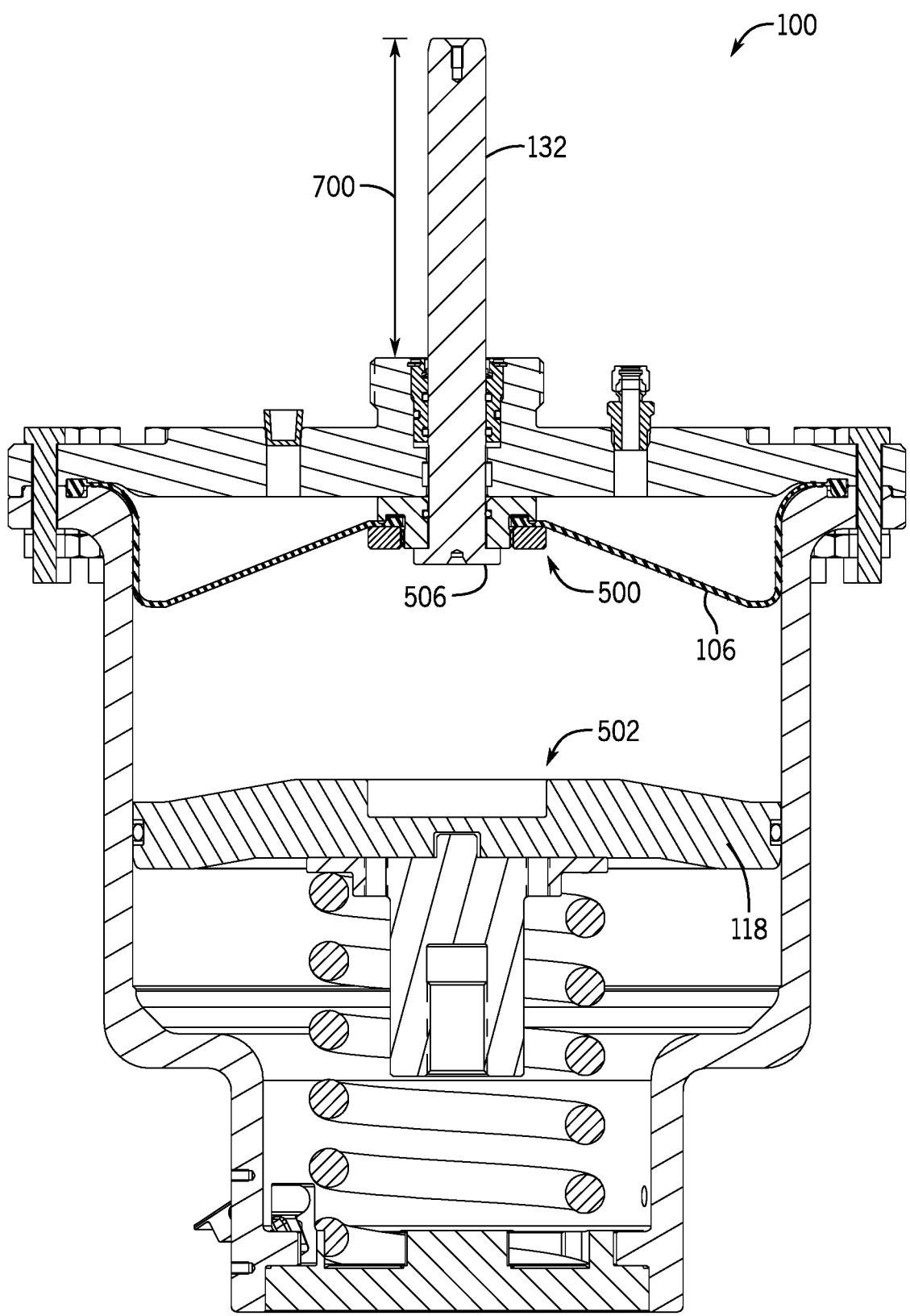
FIG. 8 is a cross-sectional side view of an embodiment of an actuator assembly including a position indicator, in accordance with embodiments of the present disclosure.

FIG. 8 is a cross-sectional side view of an embodiment of the actuator assembly 100 illustrating a damaged diaphragm 106. The illustrated actuator assembly 100 is shown in the open position, as opposed to the closed position of FIG. 7, and the indicator rod 132 maintains the distance 700, indicating damage to the diaphragm 106 regardless of the operational position of the valve. Accordingly, operators may receive the indication and schedule maintenance or the like.

Figure 9:
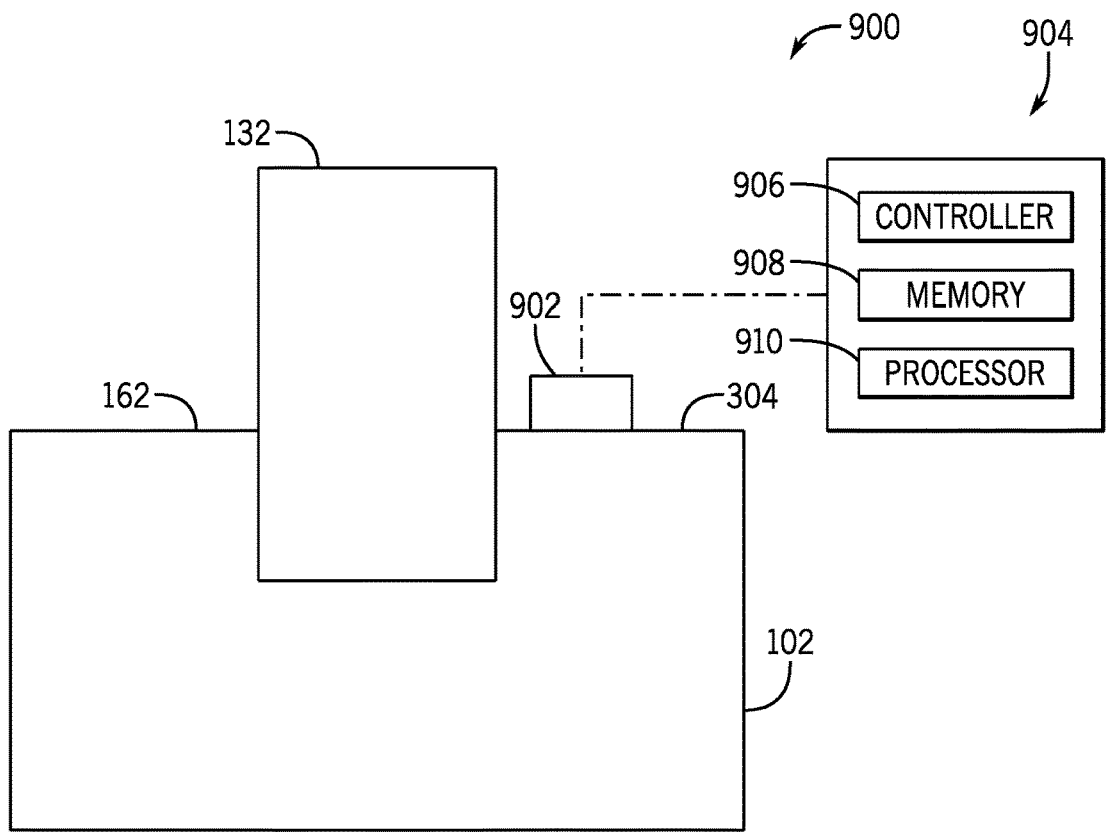
FIG. 9 is a cross-sectional side view of an embodiment of an actuator assembly including a position indicator, in accordance with embodiments of the present disclosure.

FIG. 9 is a schematic diagram of an embodiment of a position indicator 900 to determine a position of the indicator rod 132. The illustrated position indicator 900 includes a sensor 902 arranged on the lid 304 along the top 162. The sensor 902 may receive a signal from the indicator rod 132 when the indicator rod reaches a certain position (e.g., a position at a distance indicative of a damaged diaphragm 106). Thereafter, the signal may be transmitted to a control system 904, which may include a controller 906, memory 908, and processor 910. In various embodiments, control logic may be utilized to provide an alarm when a signal indicative of the damaged diaphragm is received at the control system 904.

It should be appreciated that a variety of sensors 902 may be incorporated into the illustrated position sensor 902. For example, the sensor 902 may be an optical sensor that detects a certain material or color arranged along a portion of the indicator rod 132 indicative of the damaged diaphragm 106. Additionally, the sensor 902 may be potentiometric sensor, a capacitive sensor, a magnetic sensor, a Hall-effect sensor, or the like.

Figure 10:
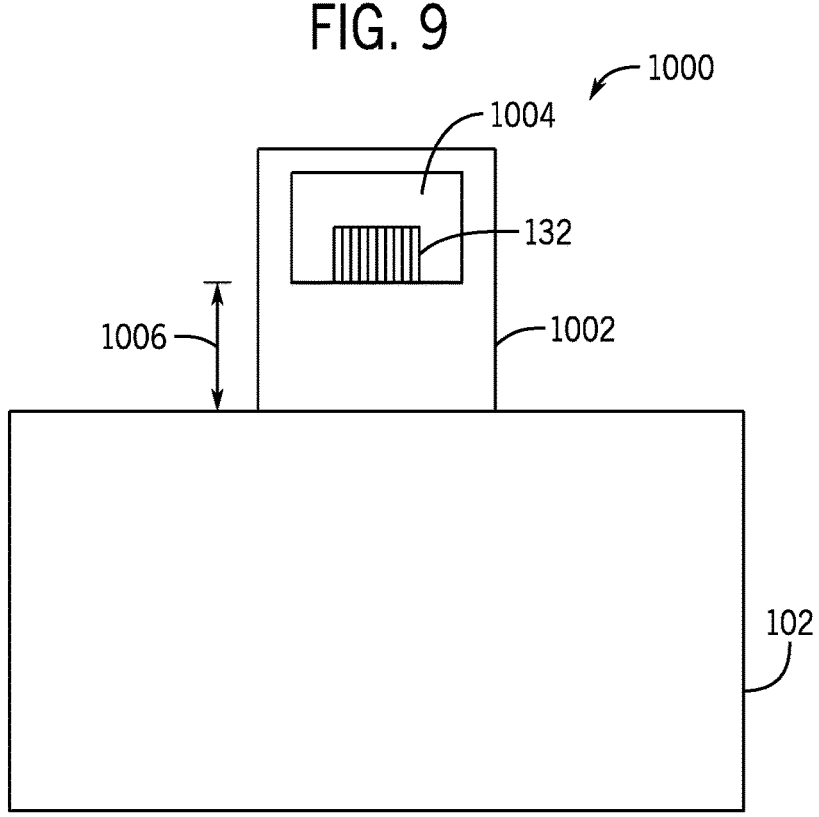
FIG. 10 is a schematic side view of an embodiment of an actuator assembly including a visual position indicator, in accordance with embodiments of the present disclosure.

FIG. 10 is a schematic side view of an embodiment of a visual position indicator 1000. In the illustrated embodiment, the housing 102 includes a cap 1002 having a window 1004 to enable an operator to determine a position of the indicator rod 132. In various embodiments, the window 1004 may be arranged at a height 1006 that enables visual inspection of the indicator rod 132 when the indicator rod 132 is at the distance (e.g., 518, 600, 700) indicative of damage to the diaphragm 106, but not in other positions. As a result, the presence of the indicator rod 132 in the window 1004 may provide an indication that the diaphragm 106 is damaged without the operator comparing the position between a damaged diaphragm 106 and a valve in a normal operating state. For example, in the illustrated embodiment, the indicator rod 132 is visible through the window 1004, and as a result, the operator is provided with an indication that the diaphragm 106 is damaged. It should be appreciated that, in other embodiments, the window 1004 may include multiple slots indicative of other operating positions (e.g., open and closed) such that indications are provided in positions where the diaphragm 106 is not damaged.

Figure 11:
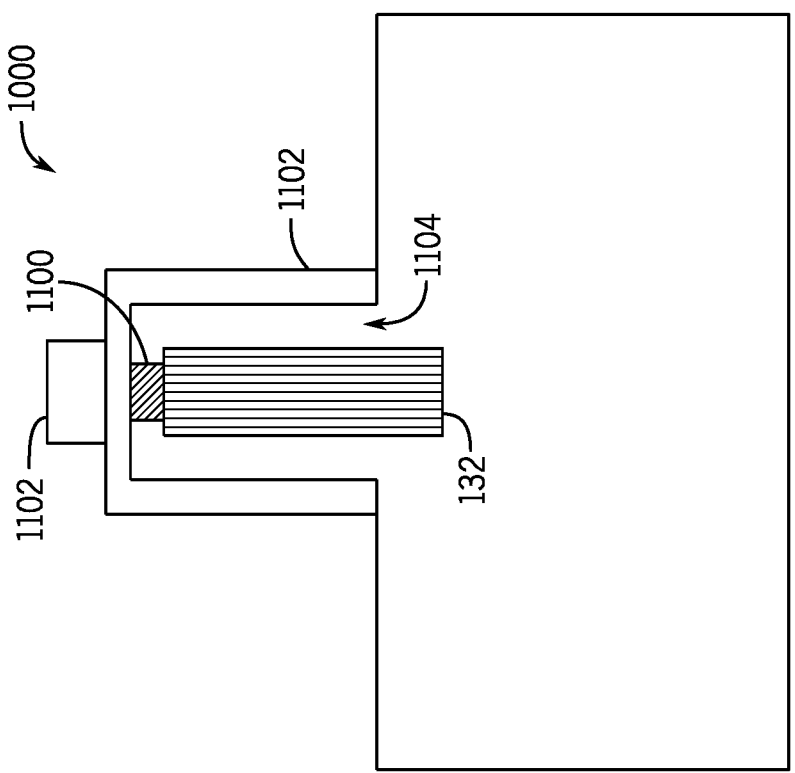
FIG. 11 is a cross-sectional side view of an embodiment of an actuator assembly including a visual position indicator, in accordance with embodiments of the present disclosure.

FIG. 11 is a schematic cross-sectional side view of an embodiment of the visual position indicator 1000 including a switch 1100 for activating an alert device 1102. In the illustrated embodiment, the switch 1100 is arranged within an interior 1104 of the cap 1002 and, upon activation by the indicator rod 132, the alert device 1102 is activated. The alert device may be an auditory alert (e.g., an alarm), a visual alert (e.g., a light), or a combination thereof. Accordingly, operators may receive notification of damaged diaphragms 106 from a distance that may be too great to view the indicator rod 132, but where a flashing light or other indication may be visible.

Figure 12:
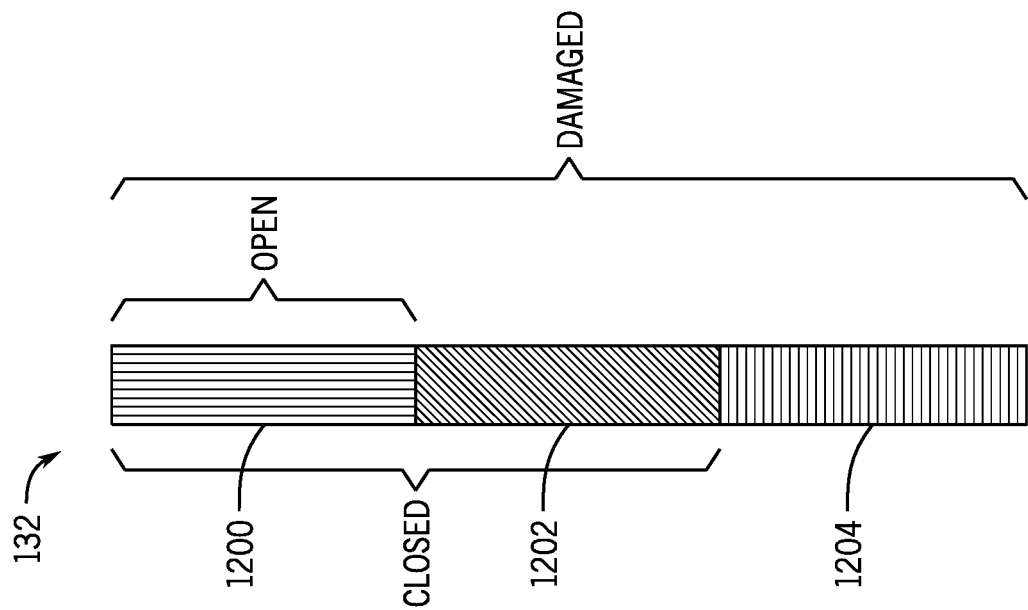
FIG. 12 is a schematic side view of an embodiment of an indicator rod, in accordance with embodiments of the present disclosure.

FIG. 12 is a schematic diagram of an embodiment of the indicator rod 132 where different sections are provided with different surface finishes or colors indicative of different positions of the valve. In the illustrated embodiment, the indicator rod 132 is divided into a first section 1200, a second section 1202, and a third section 1204 representative of different operational conditions of the valve and/or status of the diaphragm 106. As illustrated, each of the sections 1200, 1202, 1204 includes a different pattern, indicative of a visual alert to the operator. It should be appreciated that the pattern is for illustrative purposes only, and the differences may be color, text, or the like positioned on the indicator rod 132. For example, comparing the operational positions of the actuator assembly 100 illustrated in FIGS. 1-4, if the operator could only see the first section 1200, it would be indicative of the valve in the open position. If the operator could see both the first and second sections 1200, it would be indicative of the valve in the closed position. Additionally, if the operator could see the first section 1200, the second section 1202, and the third section 1204, it would be indicative of damage to the diaphragm 106. Accordingly, making the indicator rod 132 at various locations may provide a visual indication to the operator. Moreover, it should be appreciated that the various potential indicators can be combined.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. An actuator assembly for moving a valve between an open position and a closed position, comprising:
    an actuator housing forming at least a portion of a chamber for receiving a working fluid to drive movement of a valve stem of the valve;

a support plate arranged within the actuator housing, the support plate forming at least a portion of the chamber;

a diaphragm coupled to the actuator housing and the support plate, the diaphragm expanding and contracting in response to the working fluid within the chamber; and an indicator rod extending through the chamber and out of the actuator housing, the indicator rod being removably coupled to the support plate, wherein the indicator rod is arranged within an opening formed in the support plate extending axially lower than the diaphragm, the indicator rod secured to the support plate via a coupling mechanism that releases the indicator rod in response to a pressure from the working fluid between the diaphragm and the support plate.

2. The actuator assembly of claim 1, further comprising a cap coupled to the support plate, wherein the indicator rod extends at least partially into a cavity of the cap.

3. The actuator assembly of claim 2, wherein the coupling mechanism secures the indicator rod to the cap, the coupling mechanism including at least one of shear pins or a magnetic coupling.

4. The actuator assembly of claim 2, further comprising a seal arranged circumferentially about at least a portion of the indicator rod, wherein a seal diameter is substantially equal to a cavity diameter.

5. The actuator assembly of claim 1, wherein the indicator rod extends a first distance out of the actuator housing to indicate the open position, a second distance out of the actuator housing to indicate the closed position, and a third distance out of the actuator housing to indicate a damaged diaphragm, the respective distances being different from each other.

6. The actuator assembly of claim 1, further comprising a cap arranged on an exterior of the actuator housing, the cap including an interior portion that receives at least a portion of the indicator rod, wherein the cap includes a window to enable visual inspection of the indicator rod from a location outside of the cap.

7. The actuator assembly of claim 6, wherein the window is arranged at a predetermined height, the predetermined height corresponding to a rod position indicative of a damaged diaphragm.

8. The actuator assembly of claim 6, further including a switch arranged within the interior portion, wherein the indicator rod contacts the switch in response to damage to the diaphragm, the switch transmitting a signal indicative of damage to the diaphragm.

9. The actuator assembly of claim 1, wherein the indicator rod includes a first portion, a second portion, and a third portion, the first portion corresponding to first visible rod area when the valve is in the open position, the second portion corresponding to a second visible rod area when the valve is in the closed position, and the third portion corresponding to a third visible area when the diaphragm is damaged, wherein the respective visible rod portions extend out of the actuator housing in response to the respective conditions of the actuator assembly.

10. A visual position indicator for a diaphragm actuator, comprising:

an indicator rod having a first end coupled to a support plate of the diaphragm actuator and a second end extending through an opening of a lid of the diaphragm actuator such that at least a portion of the indicator rod is arranged external to a chamber of the diaphragm actuator; and a coupling mechanism that releasably secures the indicator rod to the support plate, the coupling mechanism positioning the indicator rod to translate within the chamber in response to movement of the support plate, wherein the coupling mechanism releases the indicator rod in response to a pressure from a working fluid acting at a bottom of the indicator rod, the pressure traveling along a flow path in response to at least one leak point within the chamber.

11. The visual position indicator of claim 10, wherein the leak point is between a diaphragm arranged within the chamber and the support plate.

12. The visual position indicator of claim 10, wherein the coupling mechanism comprises a cap arranged within an opening formed in the support plate, the cap receiving at least a portion of the indicator rod.

13. The visual position indicator of claim 10, wherein the coupling mechanism comprises at least one of shear pins or a magnetic coupling.

14. An actuator assembly for moving a valve between an open position and a closed position, comprising:

an actuator housing forming at least a portion of a chamber for receiving a working fluid to drive movement of a valve stem of the valve;

a support plate arranged within the actuator housing, the support plate forming at least a portion of the chamber;

a diaphragm coupled to the actuator housing and the support plate, the diaphragm expanding and contracting in response to the working fluid within the chamber; and a visual position indicator, comprising:

an indicator rod having a first end coupled to the support plate and a second end extending through an opening of a lid of the actuator housing to position at least a portion of the indicator rod external to the chamber; and a coupling mechanism that releasably secures the indicator rod to the support plate, wherein the coupling mechanism releases the indicator rod in response to a pressure from the working fluid acting at a bottom of the indicator rod, the pressure traveling along a flow path in response to at least one leak point through the diaphragm.

15. The actuator assembly of claim 14, wherein the indicator rod extends a first distance out of the actuator housing to indicate the open position, a second distance out of the actuator housing to indicate the closed position, and a third distance out of the actuator housing to indicate a damaged diaphragm, the respective distances being different from each other.

16. The actuator assembly of claim 14, wherein the coupling mechanism comprises at least one of shear pins or a magnetic coupling.

* * * * *